United States Patent [19]
Won

[11] Patent Number: 6,149,116
[45] Date of Patent: Nov. 21, 2000

[54] HOLDER FOR MOBILE TELEPHONE

[75] Inventor: Ryu Byung Won, Kyonggi-du, Rep. of Korea

[73] Assignee: D.L. Telecom Co. Ltd., Seongbuk-ku, Rep. of Korea

[21] Appl. No.: 09/286,487

[22] Filed: Apr. 5, 1999

[30] Foreign Application Priority Data

Feb. 12, 1999 [KR] Rep. of Korea ..................... 99-2359

[51] Int. Cl.⁷ ........................................... A47G 1/17
[52] U.S. Cl. .................. 248/309.4; 248/683; 248/206.5; 224/562; 224/553; 224/929; 379/446; 379/455
[58] Field of Search .................. 248/309.4, 683, 248/206.5, 298.1, 346.03; 211/70.7; 224/562, 558, 553, 555, 275, 929, 901, 483, 183; 455/550, 575, 90, 344, 345, 346, 347, 348; 379/454, 446, 455, 447, 448

[56] References Cited

U.S. PATENT DOCUMENTS

| | | | |
|---|---|---|---|
| 3,329,277 | 7/1967 | Gaudino | 211/85.9 |
| 3,416,761 | 12/1968 | Shanok et al. | 248/115 |
| 3,642,122 | 2/1972 | Von Ende | 224/562 |
| 4,319,097 | 3/1982 | Liautaud | 381/365 |
| 4,617,430 | 10/1986 | Bryant | 379/449 |
| 5,060,260 | 10/1991 | O'Connell | 379/454 |
| 5,109,411 | 4/1992 | O'Connell | 379/454 |
| 5,213,240 | 5/1993 | Dietz et al. | 224/183 |
| 5,992,807 | 11/1999 | Tarulli | 248/206.5 |

*Primary Examiner*—Anita M. King
*Assistant Examiner*—Naschica Sanders
*Attorney, Agent, or Firm*—Roth & Goldman

[57] ABSTRACT

A holder for a mobile telephone is provided, which includes a main body to which a mobile telephone is magnetically attached, and an angle controllable attachment supporting means for attaching the main body to the surface of an object such as a vehicle dashboard. The magnetic attachment means includes a magnet fixed to the main body, and a piece of iron attachable to the back of the mobile telephone and attachable to the magnet by magnetic force. The angle controllable supporting means comprises a pair of independently moveable hinge-connected supports which are also hinge-connected to the bottom of the main body. The main body can be attached to the dashboard of a vehicle without regard to the curvature of the surface of the dashboard, and the mobile telephone can be securely attached magnetically and easily separated from the holder.

7 Claims, 6 Drawing Sheets

HOLDER FOR MOBILE TELEPHONE

BACKGROUND OF THE INVENTION

1. Field of the Invention

The present invention relates to a holder for a mobile telephone and, more particularly, to a holder for a mobile telephone, which is easily attached to the dashboard of a vehicle, allowing the mobile telephone to be safely kept and conveniently used.

2. Discussion of Related Art

A holder for a mobile telephone is conventionally attached to the dashboard of a vehicle, and the mobile telephone is inserted and kept in the inlet of the holder. However, the conventional holder does not have a device for tightly attaching the holder to an object such as the dashboard of a vehicle, the device being adjusted according to the curvature and angle of the object. Accordingly, the conventional holder for a mobile telephone is difficult to affix to a variety of objects securely. Furthermore, the conventional holder cannot safely keep the telephone because the telephone may come out of the inlet of the holder.

SUMMARY OF THE INVENTION

Accordingly, the present invention is directed to a holder for a mobile telephone that substantially obviates one or more of the problems due to limitations and disadvantages of the related art.

An object of the present invention is to provide a holder for a mobile telephone, which is easily attached to the dashboard of a vehicle, allowing the mobile telephone to be safely kept and conveniently used.

To accomplish the object of the present invention, there is provided a holder for a mobile telephone, including a main body to which a mobile telephone is attached by means of a magnetic attachment means, and an angle controllable attachment supporting means for attaching the main body to the surface of an object, the angle of the angle controllable attachment supporting means being controlled.

The magnetic attachment means includes a magnet fixed to the main body, and a piece of iron fixed to the back of the mobile telephone and attached to the magnet by magnetic force.

The main body has a depression on its top, the depression having a fixing hollow to which the magnet is fixed, the piece of iron being inserted into the depression to be attached to the magnet.

The angle controllable supporting means is constructed in such a manner that a couple of supports, which are hinged-connected to each other to be able to be bound together, are rotatably hinged-connected to hinge pieces formed at both sides of the bottom of the main body.

The supports of the angle controllable supporting means have a two-sided adhesive tape attached thereon, the two-sided adhesive tape being attached to the surface of the object, the two-sided adhesive tape being formed of an elastic material.

The holder for a mobile telephone of the invention further includes a separation/attachment means for easily separating the piece of iron from the magnet, the separation/attachment means including an elevating member elevatably inserted into a hole formed at one side of the depression of the main body, a pressing member slidably connected to a slide cut formed at the lower part of the middle portion of the main body, the pressing member elevating the elevating member, and a spring connected between a supporting cut formed at the internal side of the slide cut of the main body and a supporting protrusion formed at the internal side of the pressing member, the spring externally elastically supporting the pressing member.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

DETAILED DESCRIPTION OF PREFERRED EMBODIMENT

Figure 1:
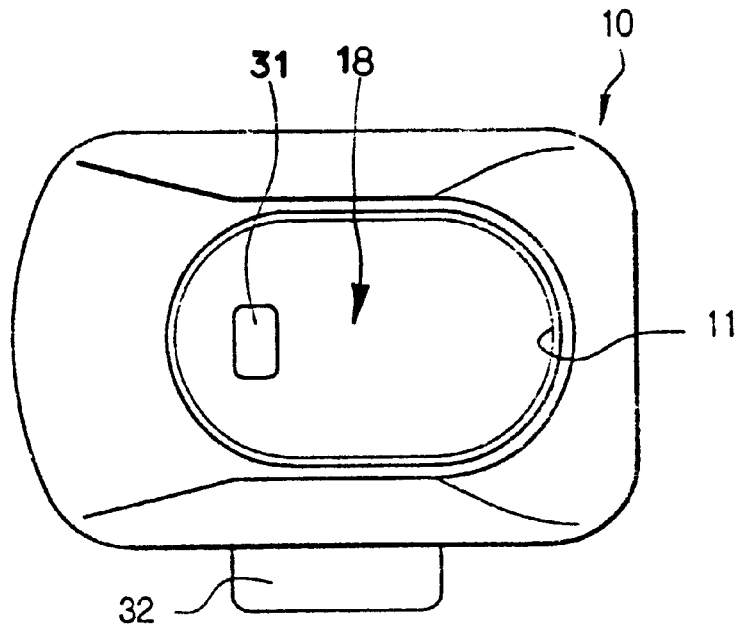
FIG. 1 is a plan view of a holder for a mobile telephone according to the present invention.
Figure 2:
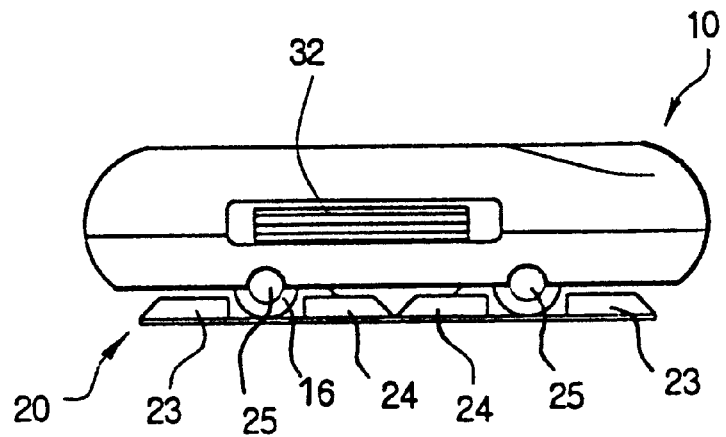
FIG. 2 is a front view of the holder for a mobile telephone according to the present invention.
Figure 3:
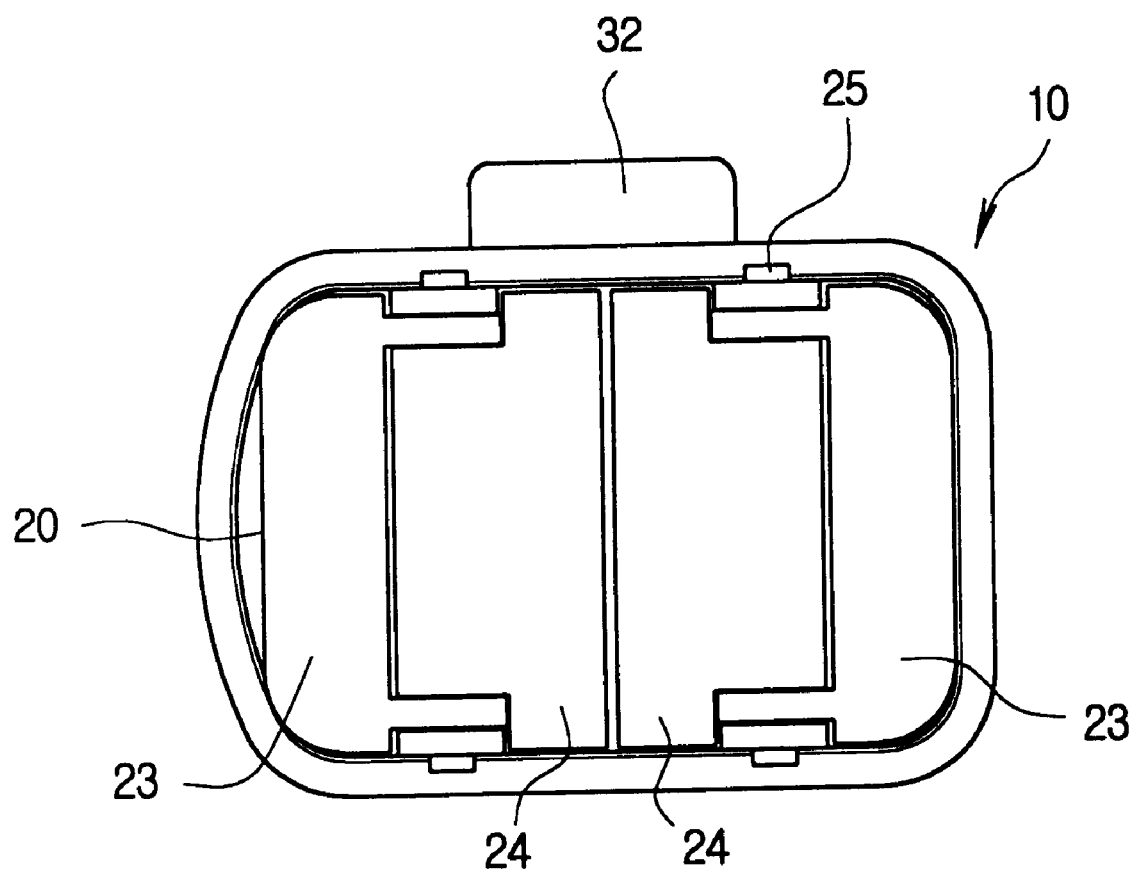
FIG. 3 is a view showing the bottom of the holder for a mobile telephone according to the present invention.
Figure 4A:
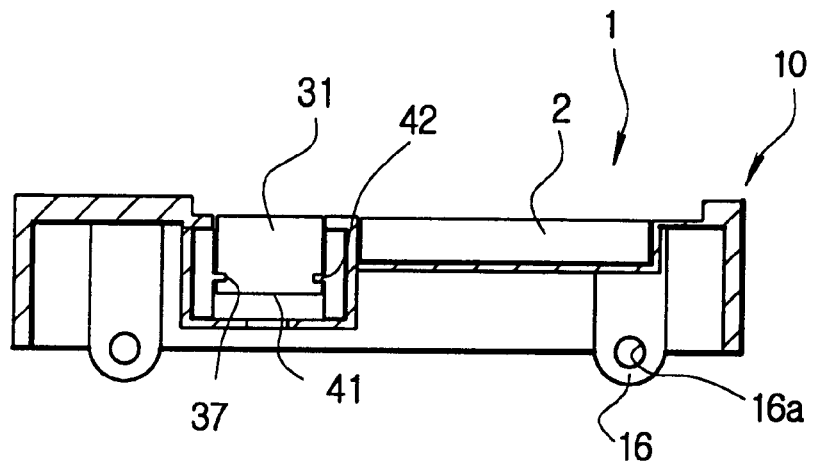
FIGS. 4A and 4B are sectional views of the holder for a mobile telephone taken along the direction of the length, according to the present invention.
Figure 4B:
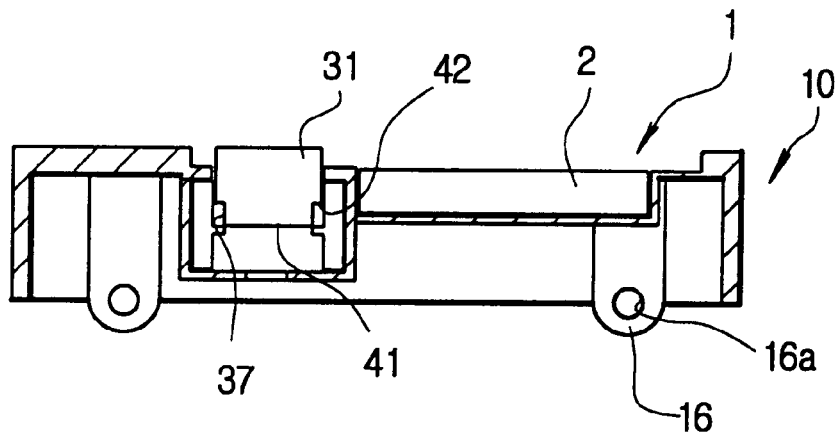
Figure 5A:
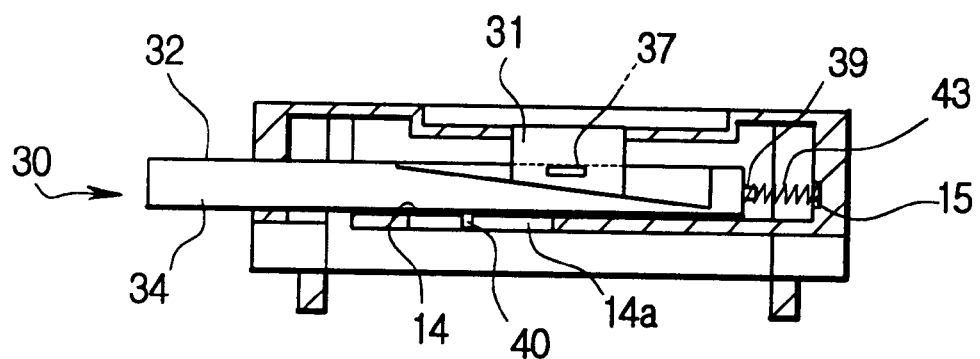
FIGS. 5A and 5B are sectional views of the holder for a mobile telephone, taken along the direction of the width, according to the present invention.
Figure 5B:
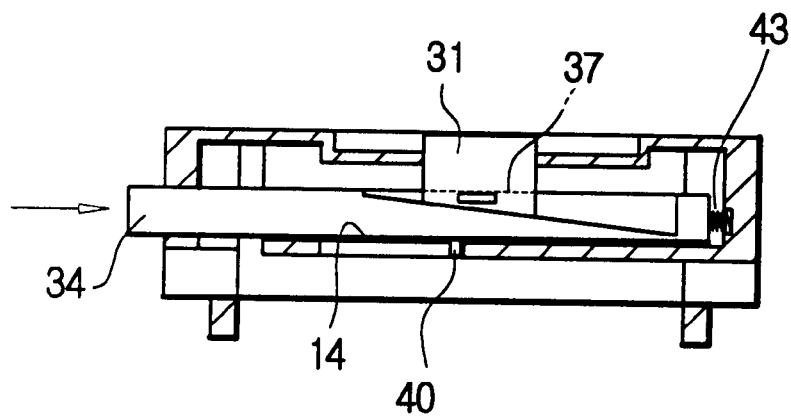
Figure 6:
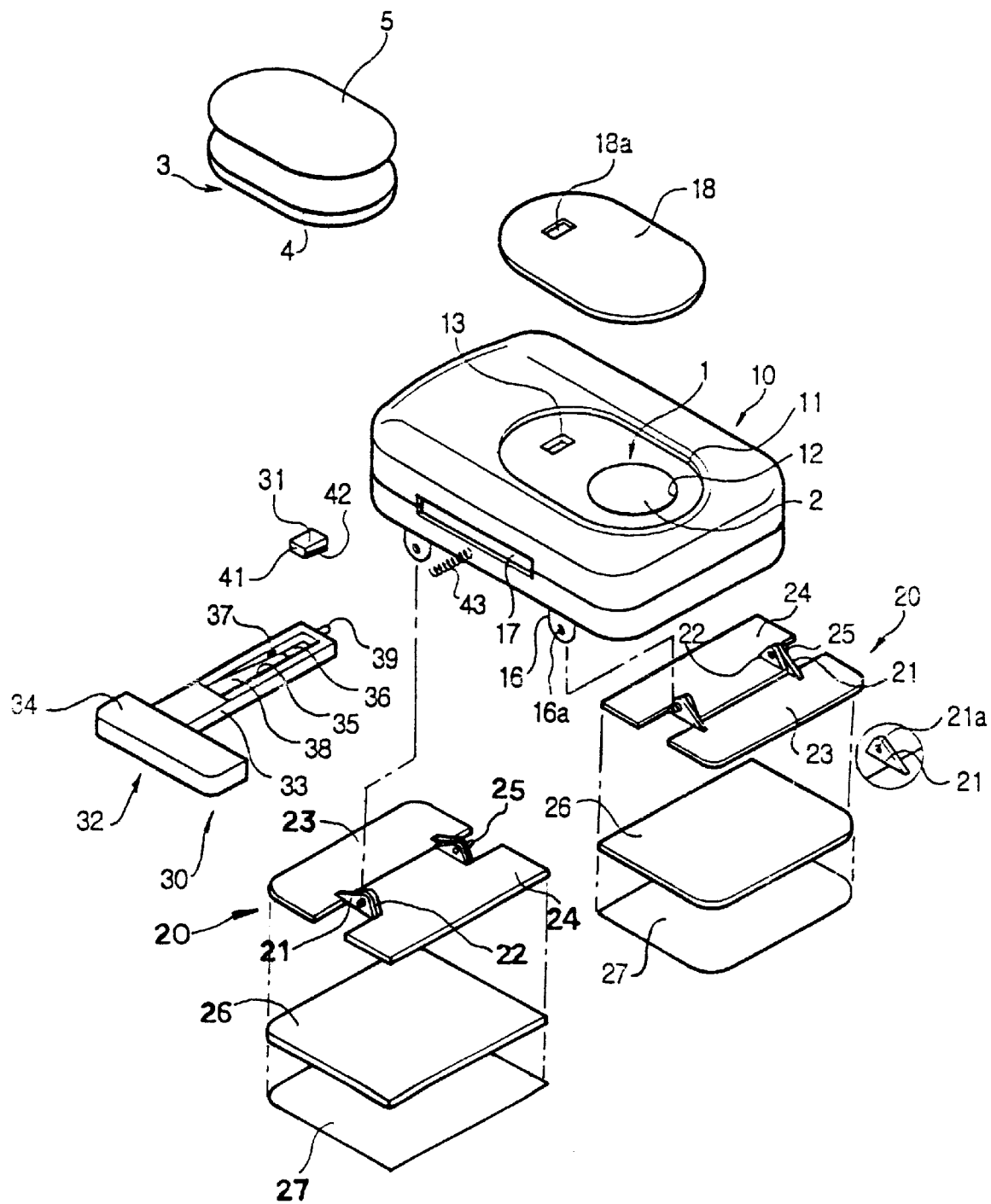
FIG. 6 is an exploded view of the holder for a mobile telephone according to the present invention.
Figure 7:
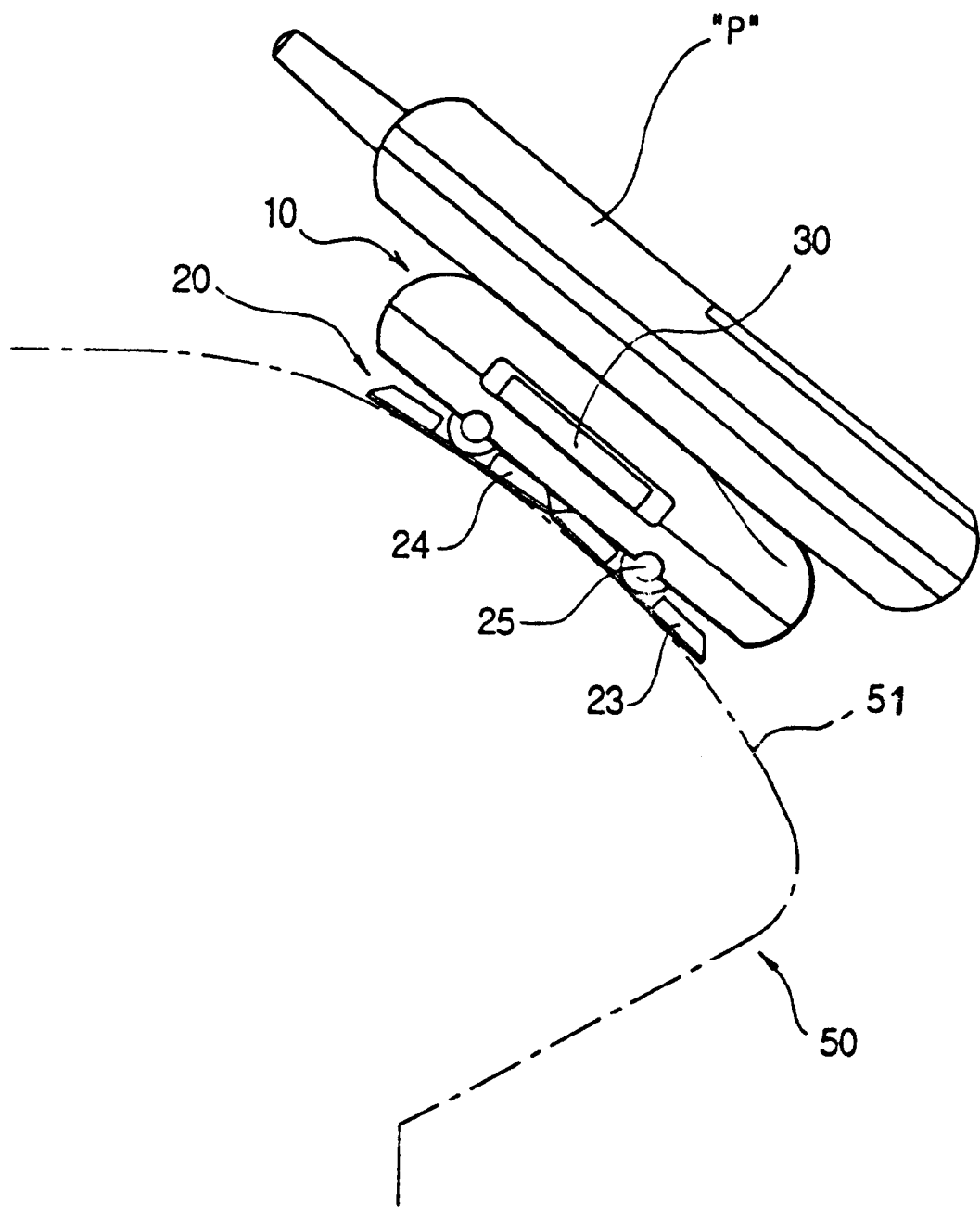
FIG. 7 is a side view of the holder for a mobile telephone when it is being used.

Reference will now be made in detail to the preferred embodiments of the present invention, examples of which are illustrated in the accompanying drawings.

Referring to the drawings, the holder includes a main body 10 to which a mobile telephone P is attached by means of a magnetic attachment means 1, and an angle controllable attachment supporting means 20.

Magnetic attachment means 1 includes a magnet 2 fixed to main body 10, and a piece of iron 3 fixed to the back of the mobile telephone and attached to magnet 2 by magnetic force. Main body 10 has a depression 11 on its top, depression 11 having a circular hollow 12 to which disk-shape permanent magnet 2 is fixed. The piece of iron 3 has a two-sided adhesive tape 4 attached to its top, and a protection paper 5 adheres to the top of two-sided adhesive tape 4.

The angle controllable attachment supporting means 20 is constructed in such a manner that a couple of supports 23 and 24, which are hinged-connected to each other to be able to be bound together, are rotatably hinged-connected to hinge pieces 16 formed at the both sides of the bottom of main body 10. Supports 23 and 24 have hinge pieces 21 and 22 respectively, and they are hinged-connected to each other in such a manner that a hinge shaft 25 formed at the one hinge piece 22 is inserted into a hinge hole 21a formed in the other hinge piece 21. Hinge pieces 16 each of which has a hinge hole 16a are respectively formed at the both sides of the bottom of main body 10, and hinge shaft 25 of each of supports 23 and 24 is inserted into each hinge hole 16a.

A two-sided adhesion tape 26 adheres to the bottom of the supports 23 and 24, to be attached to the surface of an object to which the holder will adhere. The two-sided adhesion tape has a protection paper 27 attached to its bottom. The supports 23 and 24 change the angle between them, being folded or unfolded on the hinge shaft 25. The two-sided adhesion tape 26 is formed of an elastic material to be adapted for binding of supports 23 and 24.

The piece of iron 3 can be easily separated from magnet 2 according to a separation/attachment means 30 which includes an elevating member 31 being elevatably inserted into a hole 13 formed at one side of depression 11 of main body 10, a pressing member 32 slidably connected with a slide cut 14 which is formed at a lower part of the middle portion of main body 10, the pressing member 32 elevating the elevating member 31, and a spring 43 elastically urging pressing member 32 to the outside. Spring 43 is connected between a support cut 15 formed at the internal side of slide cut 14 and a support protrusion 39 formed at the internal side of pressing member 32.

Pressing member 32 is constructed in such a manner that its pressing portion 34 is formed at one edge of a sliding portion 33 having a longitudinally extending guide cut 35 and a hole 36, the pressing portion 34 and sliding portion 33 being formed in a body. Guide cut 35 has guide protrusions 37 each of which is formed at both sides of sliding portion 33. Elevating member 31 is inserted into guide cut 35 of pressing member 32, allowing the slope 41 of the bottom of elevating member 31 to come into contact with the slope 38 of guide cut 35 and allowing guide protrusions 37 to be inserted into guide cuts 42 respectively formed at the both sides of the bottom of elevating member 31.

With pressing member 32, pressing portion 34 is wider than sliding portion 33, pressing portion 34 being externally protruded from an opening 17 formed at the side of main body 10. There is a stop 40 formed at the middle portion of the bottom of slide portion 33 of pressing member 32, the stop 40 being inserted into a guide hole 14a formed at the middle of slide cut 14.

Pressing member 32 is pushed into the main body 10, elevating the elevating member 31. When pressing member 32 is released, it is moved back to its original position according to the restoring elastic force of spring 43 to allow elevating member 31 to descend. Here, pressing member 32 does not externally come out off the main body even if the external elasticity of spring 43 is applied thereto because stop 40 formed at the bottom of sliding portion 33 is inserted into guide hole 14a formed at the bottom of slide cut 14, being stuck. A deck plate 18 having a hole 18a portion for exposing elevating member 31 is attached to the top of main body 10, to cover magnet 2, adding a sense of beauty to the holder.

When the holder for a mobile telephone of the invention, constructed as above, is attached to the surface 51 of object 50 such as the dashboard of a vehicle, protection paper 27 is taken off two-sided adhesive tape 26 attached to the bottom of both supports 23 and 24 of main body 10 and supports 23 and 24 are attached to the surface 51 of object 50, allowing supports 23 and 24 to be rotatably connected to main body 10. Here, supports 23 and 24 are securely attached to the surface 51 of object 50, the angle between them being controlled as long as they are bound to each other, even if the surface 51 is bent, indented or angled as well as plane because supports 23 and 24 are connected to each other to be able to be folded or unfolded.

When protection paper 5 is taken off two-sided adhesion tape 4 attached to piece of iron 3, piece of iron 3 is attached and fixed to the back of mobile telephone P, and this piece of iron 3 adhering to mobile telephone P is inserted into depression 11 of main body 11, piece of iron 3 adheres to magnet 2 fixed to main body 10 by strong magnetism, stably keeping mobile telephone P from coming off the holder.

When mobile telephone P is required to be separated from main body 10 of the holder for a telephone call, pressing portion 34 of pressing member 32 is pushed to slide sliding portion 33 on slide cut 14 of main body 10, allowing sliding portion 33 to be moved to the inside of slide cut 14. Upon movement of pressing member 32, elevating member 31 is inserted into guide cut 35, allowing their slopes 38 and 41 to come into contact with each other. Simultaneously, elevating member 31 is pushed to elevate, slightly separating piece of iron 3 from magnet 2, since guide protrusion 37 of sliding portion 33 is inserted into guide cut 42 of elevating member 31. This allows mobile telephone P to be easily separated from the holder.

According to the present invention, the main body of the holder is securely attached to the dashboard, the angle between its supports being controlled, even if the surface of the dashboard is bent, indented or angled. Furthermore, the mobile telephone is stably attached to the holder's main body by means of the piece of iron adhering to the telephone and the magnet fixed to the main body, and easily separated from the holder by pushing the pressing member. Accordingly, the holder for a mobile telephone of the invention can be easily set to the object such as dashboard of a vehicle, to allow the mobile telephone to be safely kept and conveniently used.

It will be apparent to those skilled in the art that various modifications and variations can be made in the holder for a mobile telephone of the present invention without departing from the spirit or scope of the invention. Thus, it is intended that the present invention cover the modifications and variations of this invention provided they come within the scope of the appended claims and their equivalents.

What is claimed is:

1. A holder for a mobile telephone, comprising:

having magnetic attachment means thereon to which a mobile telephone may be magnetically attached;

support means for attaching the main body to a surface of an object, said support means including a pair of hingedly interconnected independently moveable supports, said supports being rotatably hinge-connected to hinge pieces formed at both sides of the bottom of the main body.

2. The holder for a mobile telephone as claimed in claim 1, wherein the magnetic attachment means includes a magnet fixed to the main body.

3. The holder for a mobile telephone as claimed in claim 2, wherein the main body has a depression on its top, the depression having a recess into which the magnet is fixed.

4. The holder as claimed in claim 1, wherein the supports and of the supporting means have a two-sided adhesive tape attached thereon, said tape having an outer side for attachment to the surface of the object, and said tape being formed of an elastic material.

5. The holder as claimed in claim 1, further comprising a separation/attachment means slidably received within said holder for easily separating a piece of iron from a magnet.

6. The holder as claimed in claim 5, wherein the separation/attachment means comprises an elevating member elevatably inserted into a hole formed at one side of a depression of the main body; a pressing member slidably connected to a slide cut formed at a lower part of a middle portion of the main body, the pressing member elevating the elevating member; and a spring connected between a supporting cut formed at an internal side of the slide cut of the main body and a supporting protrusion formed at an internal side of the pressing member, the spring externally elastically supporting the pressing member.

7. The holder as claimed in claim 6 wherein the pressing member is constructed in such a manner that a pressing portion is formed at one end of a sliding portion having a guide cut and a hole therein, the pressing portion externally protruding through an opening formed at one side of the main body, and the pressing portion and sliding portion comprising an integral body; the guide cut providing guide protrusions at each side of said sliding portion; the elevating member being inserted into the guide cut in said sliding portion, allowing an inclined bottom of the elevating member to come into contact with a slope of the guide cut and allowing the guide protrusions to be inserted into the guide cuts formed at both sides of the bottom of the elevating member; and a stop formed at a middle portion of the bottom of the sliding portion is inserted into a guide hole formed at a middle portion of the slide cut.

\* \* \* \* \*